United States Patent [19]

Mentzel

[11] Patent Number: 4,512,249

[45] Date of Patent: Apr. 23, 1985

[54] SMOKER ADAPTER FOR KETTLE GRILLS

[76] Inventor: Lee R. Mentzel, Rte. 1, Shiocton, Wis. 54170

[21] Appl. No.: 487,044

[22] Filed: Apr. 21, 1983

[51] Int. Cl.³ .................... A47J 37/07; A47J 37/04
[52] U.S. Cl. .................................... 99/352; 99/482; 99/448; 126/9 R; 126/9 B; 126/25 R
[58] Field of Search ............... 99/482, 483, 448, 352, 99/449, 450, 467; 126/25 R, 30, 26, 9 B, 9 R; 248/37.3, 37.6, 201; 210/474, 476

[56] References Cited

U.S. PATENT DOCUMENTS

| | | | |
|---|---|---|---|
| 1,449,490 | 3/1923 | Barbour | 126/25 R |
| 1,752,522 | 4/1930 | Eckelman | 248/37.6 |
| 2,786,463 | 3/1957 | Vincent | 126/25 R |
| 3,399,780 | 9/1968 | Macaluso | 210/474 |
| 3,851,639 | 12/1974 | Beddoe | 126/25 R |
| 4,094,295 | 6/1978 | Boswell | 99/446 |
| 4,140,049 | 2/1979 | Stewart | 99/483 |
| 4,334,462 | 6/1982 | Hefling | 99/385 |

*Primary Examiner*—Robert W. Jenkins
*Attorney, Agent, or Firm*—Nicholas A. Kees

[57] ABSTRACT

An adapter for using with a kettle-type charcoal or gas grill to cook and smoke meat, and a method of smoking meat using the adapter. The adapter includes a vertical cylindrical peripheral wall of a diameter just smaller than the kettle grill itself. Handles are attached near the top of the wall on opposite sides. The fasteners used to attach the handles extend through the wall and support a grill rack about 12 to 18 inches above the level where the rack would be if it were in its normal position in the lower or "kettle" portion of the grill. A second grill rack is supported about six inches above the bottom of the adapter. Small clips are hooked over the edge of the kettle portion of the grill and support the adapter by means of an outstanding tab. Four such clips are generally required to support the adapter with stability. The method includes salting the food, especially if it is fish or fowl, before cooking. The fire should first be built using charcoal without wood, and the food should be cooked slowly over this fire until done. Then the wood should be added to cause the smoke, again with the food on one or both of the grills of the adapter so as to avoid using too much heat.

6 Claims, 5 Drawing Figures

SMOKER ADAPTER FOR KETTLE GRILLS

BACKGROUND OF THE INVENTION

This invention relates to methods and apparatus for smoking food and in particular to using adapters to smoke food in encloseable cookers.

Smoking meat, and particularly pork, fish and fowl, in order to preserve it and add taste has long been practiced. Until a few years ago, it was generally done in a building, or smokehouse, set apart exclusively for that purpose. With the advent of our modern mobile society, however, came a demand for a moveable apparatus which could be used to smoke meat fish and fowl, as well as other meats, to the taste of the individual. In addition, meats already smoked can be substantially more expensive than non-smoked meats, further spurring the demand for such a device.

In response to this demand, certain apparatus appeared which were designed as large slow-cookers in which wood can be added to cause smoke. Examples of these are shown in Boswell, et. al., U.S. Pat. No. 4,094,295, and Hefling, U.S. Pat. No. 4,334,462. These are rather single purpose devices, however, and the average householder may not wish to purchase these devices for only occasional use.

A great number of people, however, already have a conventional home charcoal grill. It would thus make sense to provide an apparatus to enable a householder to adapt this charcoal grill to smoke food. One such apparatus is disclosed in Stewart, U.S. Pat. No. 4,140,049. This patent discloses a small pan hung below the upper grill, holding water, so as to reduce the cooking temperature of the meat placed over it. The fuel is then placed to the side opposite the meat. The problem with this design is that it restricts the capacity of the grill, with respect to both food and fuel, to a small portion of its total capacity as a charcoal grill.

This invention relates to an improved solution to these problems.

SUMMARY OF THE INVENTION

The invention includes a vertical metal cylinder having an insulated handle on each side. Inside the wall of the cylinder are two grill racks supported by support means within the cylinder. The upper rack is mounted at the top of the cylinder, while the lower rack is mounted slightly above the bottom of the cylinder. Both racks are substantially higher than the rack in a conventional kettle grill.

It is thus an object of this invention to provide a smoker adapter for use on kettle grills, including a cylinder containing grill racks to be placed on the lower portion of the kettle grill, with the cover of the kettle grill to be placed atop the cylinder.

It is a further object of the invention to provide a method by which this adapter can be used to smoke food. This method includes first cooking the food slowly on the higher racks within the cylinder, using only charcoal in the lower portion of the kettle grill. When the food is done, the cylinder is removed and wood is added to the charcoal. When sufficient smoke has been generated, the cylinder, still containing the food, is returned to the kettle grill and the food is smoked.

Other objects and advantages of the invention will become apparent hereinafter.

DESCRIPTION OF THE PREFERRED EMBODIMENT

Figure 1:
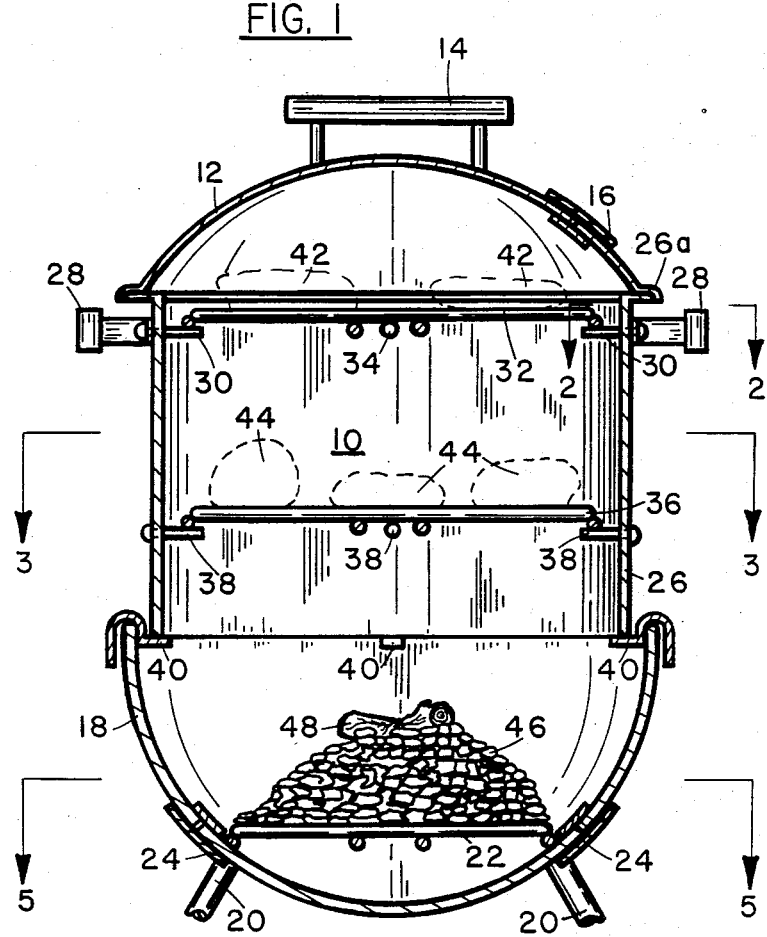
FIG. 1 is a cross-sectional view of one embodiment of the adapter in use on a conventional kettle grill.

Referring to FIG. 1, the invention includes an adapter 10 which is to be used with a conventional kettle-type grill. Such a conventional grill would include a cover 12 having a handle 14 and a vent 16. The lower or "kettle" portion 18 includes support legs 20, a flat surface 22 on which fuel is to be placed, and vents 24.

Figure 2:
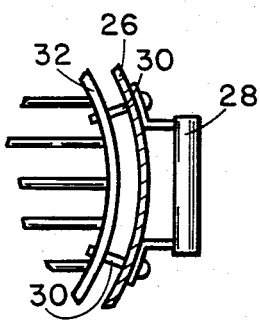
FIG. 2 is a fragmentary sectional view taken along line 2—2 of FIG. 1.

The adapter itself has a vertical cylindrical peripheral wall 26 having an open top and bottom, and a diameter just smaller than the kettle grill on which it is to be put. Near the top of cylinder 26 two handles 28 are attached on opposite sides, preferably by means of bolts 30. These bolts protrude beyond the walls of cylinder 26 to provide support for a grill rack 32. In addition, two bolts 34 are provided, offset from handles 28 by about 90 degrees, to further provide stable support for grill rack 32. As shown in FIG. 2, each handle 28 is attached to cylinder 26 by means of two bolts 30, so that the handles remain securely attached.

Figure 3:
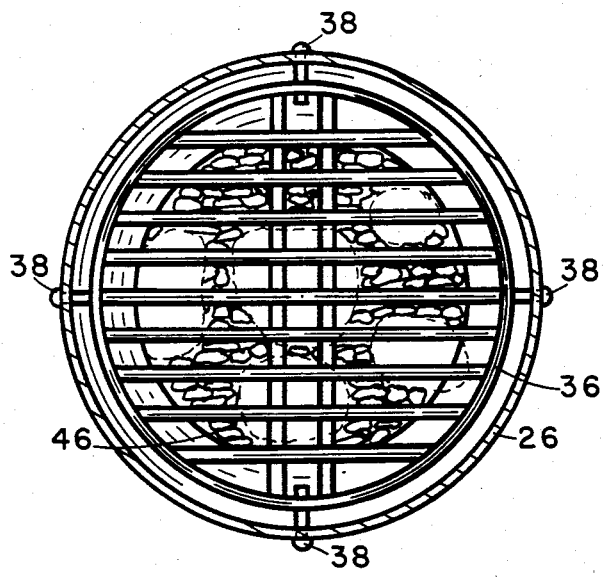
FIG. 3 is a sectional view of FIG. 1 taken along line 3—3.
Figure 5:
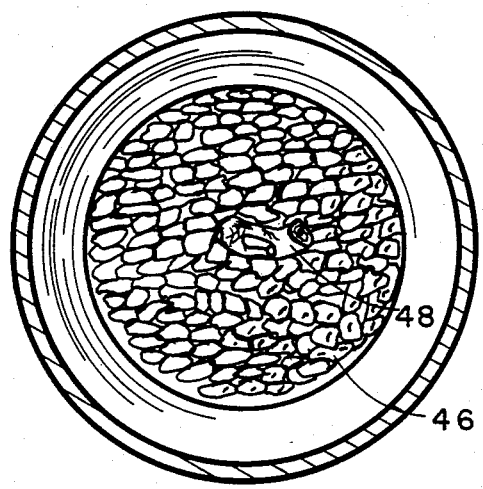
FIG. 5 is a sectional view of FIG. 1 taken along the lower line 5—5.

Similarly, as shown in FIGS. 1 and 3, a second grill rack 36 is supported at a lower level by bolts 38, which are inserted through cylinder 26 and protrude through in at least three and preferably four places to provide stable support for the grill rack.

Figure 4:
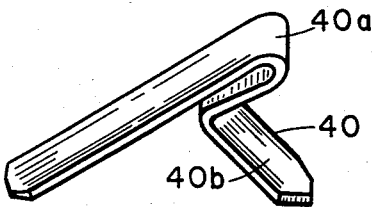
FIG. 4 is an isometric view of a clip employed in one of the embodiments of the invention.

In use as shown in FIG. 1, the cover 12 fits over a flange 26a at the top of cylinder 26. Adapter 10 is then placed into the lower portion 18 of the kettle grill and supported by clips 40. One of these clips is shown in isometric at FIG. 4. As can be seen in FIG. 1, the curved portion 40a is hooked over the edge of the kettle 18, and the outstanding tab 40b supports the adapter itself.

As employed in the following description and the appended claims, the term "meat" should be taken to include the flesh of any animal, including beef, pork, mutton, poultry, wild fowl and fish. The term "fowl" includes the meat of all types of birds. Where particular types of meat require special handling, the common name for that type of meat will be used.

To use the adapter in combination with the kettle grill to smoke meat, the meat must first be properly prepared. All fish and fowl should be scrubbed before using. The meat should then be salted. It can be salted dry, by rubbing salt in liberally. On the other hand it can be salted by soaking it in a brine solution using about three parts salt to 32 parts water. In either case the salt should be allowed to soak into the meat for ten to twelve hours at 36° to 45° F.

After salting as described above, sufficient charcoal 46 should be put in the kettle portion of the grill to first cook the meat at low heat. In this case low heat means a cooking temperature of about 180° to 225° F. Generally about five to seven pounds of charcoal will be sufficient. Any fowl should be wrapped in heavy aluminum foil. The meat should then be placed on racks 32 and 36 as shown in phantom at 42 and 44, with the larger pieces on the lower racks so that more heat is applied, and cooked until done. Generally this will take one to two hours. Fish should be placed directly on the upper rack skin or scale side down, and will take less time to cook.

When the meat is done, the adapter 10 is removed and the wood 48 for smoking is added to the burning charcoal 46. Hardwood is required because softer wood, such as pine, contains pitch and will deposit creosote on the meat. Wood chips or sawdust can be used, or the wood can be cut into pieces no longer than eight inches long and one inch in diameter. After the wood has begun to smoke, it may also flame. The flames should be smothered using cover 12. After opening the foil wrapped around the meat, adapter 10 should be replaced over kettle portion 18, and cover 12 over adapter 10, for the smoking operation. The meat should be smoked to taste, generally from one-half hour to one hour. During the smoking operation the temperature can be controlled by use of vents 16 and 24. Hence the area on which meat can be placed for smoking is not limited to a portion of one grill rack, but rather is expanded to the area of two full grill racks. The charcoal, too, can be spread over the entire lower surface 22, increasing further the capacity of the grill to smoke meat.

Cooking and smoking temperatures and times, of course, must be adjusted according to the nature of the substance being cooked and smoked.

While the method and apparatus hereinbefore described is effectively adapted to fulfill the aforesaid objects, it is to be understood that the invention is not intended to be confined to the particular preferred embodiment of smoker adapter herein set forth. Rather, the invention is to be taken as including various equivalents without departing from the scope of the appended claims.

What is claimed is:

1. A smoker adapter for use with a kettle grill having a cover and a lower kettle portion each having vents for controlling air flow, comprising:
   a vertical cylindrical peripheral wall;
   first support means about the top of said wall for supporting the cover of the kettle grill;
   second support means for supporting said wall above the lower portion of the kettle grill, said second support means being a plurality of removable clips each having a curved portion which is hooked over the edge of the kettle and an outstanding tab portion extending toward the center of the kettle, upon which tabs said wall rests;
   at least one grill rack for supporting the food to be cooked; and
   third support means for supporting said grill rack within said peripheral wall.

2. A smoker adapter as recited in claim 1 further comprising a second grill rack and means for supporting said second grill rack at a level different from said first rack.

3. A smoker adapter as recited in claim 2 wherein said first grill rack is positioned at the top of said wall and the second grill rack is positioned about two-thirds of the way down from the top of said wall.

4. A smoker adapter as recited in claim 2 further comprising two handles, each attached to opposite sides on the outside of said wall by attachment means.

5. A smoker adapter as recited in claim 4 wherein said attachment means for said handles also function as part of said third support means for supporting said first grill rack.

6. A smoker adapter as recited in claim 1 wherein said clips accommodate the diameter of said peripheral wall being less than the diameter of the lower kettle portion.

* * * * *